US009618392B2

(12) United States Patent
Kippenberg et al.

(10) Patent No.: US 9,618,392 B2
(45) Date of Patent: Apr. 11, 2017

(54) SPECTROSCOPY ASSEMBLY INCLUDING OPTICAL RING RESONATORS AND AT LEAST ONE WAVEGUIDE ON A COMMON SUBSTRATE (75) Inventors: Tobias Kippenberg, Lausanne (CH); Ronald Holzwarth, Munich (DE)

(73) Assignees: MENLO SYSTEMS GMBH, Martinsried (DE); ECOLE POLYTECHNIQUE FEDERALE DE LAUSANNE, Lausanne (CH)

( * ) Notice: Subject to any disclaimer, the term of this patent is extended or adjusted under 35 U.S.C. 154(b) by 528 days.

(21) Appl. No.: 14/112,608

(22) PCT Filed: Apr. 27, 2012

(86) PCT No.: PCT/EP2012/001827
§ 371 (c)(1),
(2), (4) Date: Jan. 22, 2014

(87) PCT Pub. No.: WO2012/146387
PCT Pub. Date: Nov. 1, 2012

(65) Prior Publication Data
US 2014/0192363 A1    Jul. 10, 2014

(30) Foreign Application Priority Data

Apr. 29, 2011  (DE) .................. 20 2011 100 022

(51) Int. Cl.
G01J 3/45      (2006.01)
G01J 3/42      (2006.01)
(Continued)

(52) U.S. Cl.
CPC . G01J 3/45 (2013.01); G01J 3/42 (2013.01); G01J 3/457 (2013.01); G01J 3/4531 (2013.01);
(Continued)

(58) Field of Classification Search
CPC . G02B 6/29338; G02B 6/12007; G01J 3/457; G01J 3/45; G01J 3/4532; G01J 3/42; G01J 3/4531
See application file for complete search history.

(56) References Cited

U.S. PATENT DOCUMENTS 7,145,660 B2*  12/2006  Margalit ............ G01N 21/7746
                                                       356/477
2007/0182966 A1    8/2007  Sanders et al.

FOREIGN PATENT DOCUMENTS

JP        2009-252905 A    10/2009

OTHER PUBLICATIONS

Miller, A., K. R. Welford, and B. Daino. Nonlinear Optical Materials and Devices for Applications in Information Technology. Dordrecht: Kluwer Academic, 1995. 68.*

(Continued)

Primary Examiner — Hwa Lee
(74) Attorney, Agent, or Firm — Flynn, Thiel, Boutell & Tanis, P.C.

(57) ABSTRACT

A spectroscopy assembly having a first and a second optical ring resonator, each provided with a material having an intensity-dependent refraction index. The spectroscopy assembly further includes at least one waveguide, which is guided along the optical ring resonator at a distance such that the light of a continuous wave laser guided in the waveguide can be coupled into the optical ring resonator, and a frequency comb generated from the light of the continuous wave laser in the optical ring resonator can be coupled out of the waveguide. The optical ring resonators and the at least one waveguide are provided on a common substrate.

20 Claims, 11 Drawing Sheets (51) Int. Cl.
*G01J 3/453* (2006.01)
*G01J 3/457* (2006.01)
*G02B 6/12* (2006.01)
*G02B 6/293* (2006.01)

(52) U.S. Cl.
CPC ........ *G01J 3/4532* (2013.01); *G02B 6/12007* (2013.01); *G02B 6/29338* (2013.01); *G02B 6/29353* (2013.01)

(56) References Cited

OTHER PUBLICATIONS

Form PCT/IB/338 PCT Notification of Transmittal of Translation of the International Preliminary Report issued in European Application No. PCT/EP2012/001827, date of mailing Nov. 7, 2013 (1 page).
Form PCT/IB/373 PCT International Preliminary Report issued in European Application No. PCT/EP2012/001827, dated Oct. 29, 2013 (1 page).
Form PCT/ISA/237 PCT Translation, Written Opinion of the International Searching Authority issued in European Application No. PCT/EP2012/001827, date of mailing Jul. 31, 2012 (8 pages).
Form PCT/ISA/210 International Search Report issued in Application PCT/EP2012/001827 with English translation mailing date Jul. 31, 2012 (6 pages).
Pascal Del'Haye et al., Octave-Spanning Tunable Frequency Combs on a Chip, Optical Communication (ECOC), 2010 36$^{th}$ European Conference and Exhibition, Sep. 19, 2010, pp. 1-2.
Jacob S. Levy et al., Monolithically integrated multiple wavelength oscillator on silicon, XP55032834, Jan. 1, 2009 (14 pages).

* cited by examiner

SPECTROSCOPY ASSEMBLY INCLUDING OPTICAL RING RESONATORS AND AT LEAST ONE WAVEGUIDE ON A COMMON SUBSTRATE

The invention relates to planar, i.e. chip-based, spectroscopy assembly that may be used for the spectroscopic characterization of molecules, gases or liquids.

Scientific examinations showed that in an optical ring resonator of a material with an optical third-order non-linearity, i.e. an intensity-dependent refraction index, an optical frequency comb may be generated quasi "passively" when light of a continuous wave (cw) laser is coupled into this optical ring resonator. If the light of the continuous wave laser essentially corresponds to a mode of the optical ring resonator, side bands may be generated by four-wave mixing processes from which altogether a frequency comb results. This frequency comb may subsequently be again coupled out of the optical ring resonator.

It is the object of the present invention to provide, in view of this effect, a preferably efficient and robust spectroscopy assembly.

This object is achieved by a spectroscopy assembly having the features of claim 1. Advantageous further developments of the invention are stated in the subclaims.

According to the invention, two (or optionally even more) optical ring resonators are provided or integrated on a common (shared) substrate together with at least one waveguide provided for coupling light into the ring resonators. Here, the optical ring resonators, which may have, for example, the shape of a geometric circle with a radius of 100 to 1000 μm, slightly differ optically by their geometry, their material and/or by a possibly provided coating. Even highly elliptic or compressed shapes of the rings are possible. Said difference between the two optical ring resonators causes a slight variation of the free spectral range (FSR) of the two ring resonators corresponding to the inverse round-trip time of light in the respective resonator. Thereby, in turn, the mode distances of the frequency combs coupled out of the two ring resonators into the waveguide or waveguides slightly differ. In case of a superimposition of the two frequency combs on a common photodiode or another optical detector, by means of multi-heterodyne spectroscopy, beat frequencies may be detected and measured which are within radiofrequency range.

If only one of the two ring resonators and/or the frequency comb coupled out of this ring resonator is exposed to a sample, for example by contacting a gaseous or liquid sample with a surface of the ring resonator or the following waveguide, the spectral power density of the beat frequencies changes, and conclusions may be drawn to the properties of the sample.

An essential advantage of the spectroscopy assembly according to the invention resides in the fact that the optical ring resonators and the waveguide or waveguides are integrated on a common substrate. This permits to avoid any adjustment, and the spectroscopy assembly becomes very robust.

The spectroscopy assembly may be further improved by also providing one or several continuous wave lasers for optically pumping the ring resonators, and/or an optical detector, such as a photodiode, on the substrate. For this, all components of the spectroscopy assembly could be manufactured by microstructuring methods (such as lithography or etching) from a common substrate, in particular a semiconductor substrate.

A further improvement is obtained by designing the (multi-heterodyne) spectroscopy assembly to be self-calibrating. For this, the two frequency combs are split and caused to beat twice on two different photodetectors. A sample to be examined is then only introduced into one of the beat branches. The second, non-disturbed path serves for referencing. In this manner, a reference signal for determining absorption is produced, and thus self-referencing of the spectrometer is achieved.

The phase noise of the generated frequency combs may be reduced by utilizing a "prohibited crossing" for generating high local anomalous dispersion. In resonators supporting two or more mode families, these mode families may be coupled to each other. This may be done by a suited selection of the resonator geometry, by corrugations (unevenness) of the resonator wall, or by a non-circular deformation of the resonator geometry. It is the aim of the assembly to generate two coupled optical resonances with a coupling power that is greater (measured by the frequency distance) than the respective line widths of the two resonances belonging to different mode families, so that the frequency distance to the next-higher and next-lower resonance amounts to more than the line width of the resonances and very anomalous dispersion is generated thereby locally. Said resonance is pumped and generates a frequency comb with very low phase noise which is used for the spectroscopy assembly. The pump lasers are stabilized in this assembly to the resonance of a lower frequency.

The pump laser or pump lasers of the spectroscopy assembly are normally lasers with one (single) longitudinal mode. It may be advantageous to impress side bands onto this laser by suited modulation, so that pumping is not performed with only one mode but e. g. with two or more modes. If the mode distance of the pump laser modes is near the mode distance of the microresonator, a tuning of the generated frequency comb may be achieved thereby. Here, a triple pump arrangement (i. e. a pump mode with two side bands) as it is achieved e. g. by phase modulation is particularly advantageous. Amplitude modulation is also conceivable.

It may moreover make sense to re-amplify the generated pumping light in an optical amplifier, i. e. to employ a seed laser and a subsequent optical amplifier. This may be a fiber- or semiconductor-based amplifier. In modulation, a Mach-Zehnder interferometer may also be employed.

For introducing the substance to be examined into the spectroscopy assembly, one may resort to microfluidic technology. Here, the substance to be examined may be guided into channels and thus be selectively contacted with the microresonator. For this, corresponding channels are attached above the waveguide of the microresonator.

The invention also relates to a method of manufacturing such a spectroscopy assembly and to the use of such a spectroscopy assembly for the spectroscopic examination of samples, for example of molecules, gases or liquids.

Below, different embodiments of a spectroscopy assembly according to the invention will be illustrated more in detail with reference to a drawing. The figures show in detail:

FIG. 3 a schematic representation of the course of the waveguide in a second embodiment, FIG. 4 a schematic representation of a third embodiment of a spectroscopy assembly, FIG. 5 a schematic representation of the spectroscopy assembly according to FIG. 4 with the substrate, FIG. 6 a schematic representation of the spectroscopy assembly according to FIG. 3 with the substrate, FIG. 7 a schematic representation of the spectroscopy assembly according to FIG. 4 with coupling in and out, FIG. 8 a variant of the spectroscopy assembly shown in FIG. 7, FIG. 9 a spectroscopy assembly with a sample, FIG. 10 a spectroscopy assembly with another arrangement of the sample, and FIG. 11 a spectroscopy assembly with self-referencing.

Equal or corresponding components are always provided with the same reference numerals in the figures.

In the first embodiment (FIG. 1), on a substrate or semiconductor chip (for example of silicon), two optical ring microresonators 1, 3 and two waveguides 2, 4 which consist of a material, such as SiN, HfO2 or silicon are generated by microstructuring methods. The two waveguides 2, 4 are each coupled to an optical fiber 2a, 4a which are each coupled to a continuous wave (cw) laser source 2b, 4b. The coupling in into the waveguide 2, 4 may be accomplished, for example, by a lens. The waveguides 2, 4 located on the chip or substrate each couples to an optical annular microresonator 1, 3. Coupling here means that a portion of the incident optical laser performance is coupled into the resonator 1, 3 by evanescent coupling and corresponding mode adaptation.

Figure 1:
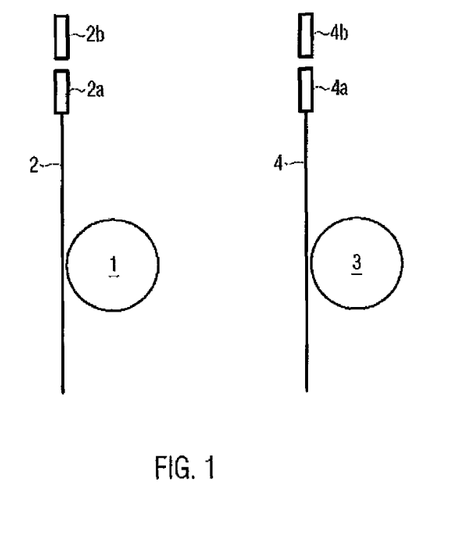
FIG. 1 a schematic representation of the waveguides and ring resonators.

The two annular microresonators 1, 3 are characterized in that their free spectral ranges, characterized as the inverse round-trip time of light in the resonator, differ by a fraction of the mean free spectral range of the two resonators 1, 3, typically by less than 1/100. The optical annular microresonator 1, 3 here has a material having a third-order non-linearity, i. e. an intensity-dependent refraction index. Here, a material with inversion symmetry is required. The resonators 1, 3 furthermore have a small variation of the free spectral range by a suited selection of the geometry of the annular microresonator 1, 3 and suited coatings. The residual variation of the free spectral range is here selected such that the FSR (free spectral range) increases as frequency increases (anomalous dispersion).

The two continuous wave (cw) lasers 2b, 4b emit an optical frequency which is near resonant with a resonant frequency of one of the optical modes of the microresonator 1, 3. Performance is adapted such that parametric oscillation takes place which corresponds to a generation of many parametric side bands with nearly the same performance and a distance corresponding to the free spectral range of the resonator 1, 3 (i. e. a frequency comb is generated). The newly generated frequency components of the frequency comb are then coupled out of the waveguide 2, 4 again and each coupled again into two optical fibers and brought to interference on a common (shared) photodiode. A detector detects the beat frequencies on the photodiode which are subsequently analyzed spectrally. The laser performance and laser frequency of the continuous wave (cw) laser 2b, 4b are adapted such that a plurality of beats is formed at a regular distance in the radiofrequency range.

For the spectroscopic examination of gases, molecules or liquids, one of the two resonators is directly exposed to the substance to be examined in the assembly. Interaction here takes place via the evanescent field of the resonator 1, 3 which to this end may directly contact the substance to be examined. This may be realized, for example, by the gas (liquid etc.) being in direct contact with the surface of the dielectric annular waveguide. The spectroscopic information is here extracted from the beat signal according to the well-known technology of multi-heterodyne spectroscopy. The spectral bandwidth of the recorded spectrum here includes the spectrum of the generated parametric side bands of the frequency comb.

In the spectroscopy assembly according to FIG. 1, a ring resonator 1 is in contact with a waveguide 2 (fiber, tapered fiber, SiN waveguide, etc.). If light of a continuous wave laser 2b is coupled into the waveguide 2 (this means coming from above in FIG. 1), the light is coupled over into the ring resonator 1, and a frequency comb with a mode distance f1 is "passively" generated in the resonator.

A second ring resonator 3 is operated with a waveguide 4 in a similar configuration and generates a frequency comb with mode distance f2 which differs from f1.

The two frequency combs generated in this manner are combined again and may then be used for multi-heterodyne spectroscopy.

The resonators 1, 3 each have a distance of about 0 to 1000 μm from the waveguide 2, 4 associated with them, and a diameter of about 120 to 160 μm.

Figure 2:
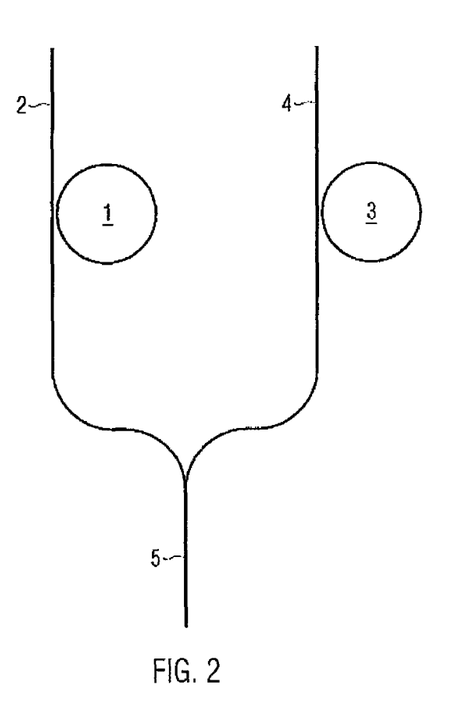
FIG. 2 a schematic representation of the joining of the two frequency combs.

The joining of the two waveguides may be achieved—as is shown in FIG. 2—by fiber-optic components, or directly by a corresponding shaping of the waveguides in SiN on an Si chip. Then, there is a shared output 5 which contains both frequency combs with mode distances f1 and f2.

Several alternative embodiments which are equivalent as to their functioning will be described below:

a) Two continuous wave (cw) lasers 2b, 4b are coupled into one single fiber and coupled into one single planar waveguide. The planar waveguide is split on the substrate (chip) and pumps two separate annular microresonators. The frequencies of the continuous wave lasers are different and are each near resonant with optical modes of the respective two annular microresonators.

b) The two continuous wave lasers are coupled into one single fiber and coupled into one single waveguide where both optical microresonators are located.

c) The two continuous wave lasers are replaced by one single continuous wave laser coupling to one single waveguide. This waveguide is coupled to two optical microresonators the free spectral ranges of which differ, but which have a common frequency of resonance that is near the frequency of the input continuous wave laser.

d) The microresonators may each be coupled with two waveguides, one being used for pumping with the continuous wave laser, and the second waveguide being used for coupling out the frequency components located in the resonator. The light coupled out into this second waveguide is used for interference and for the determination of the optical spectrum by means of the multi-heterodyne method.

The arrangement of the spectral analysis of gases or liquids may here also have several designs:

A) The gas or the liquid to be detected may interact, instead of directly on one of the surfaces of the microresonator, also with the surface of one of the waveguides and thus change the spectrum of the frequency comb as to its intensity and/or phase. The reference frequency comb is here not exposed to the gas or liquid.

B) The gas or the liquid to be detected may be fed to the generated frequency comb in a separate assembly, by means of an optical fiber, in which the waveguide couples out the frequency comb. The reference frequency comb is here not exposed to the gas or liquid.

Figure 3:
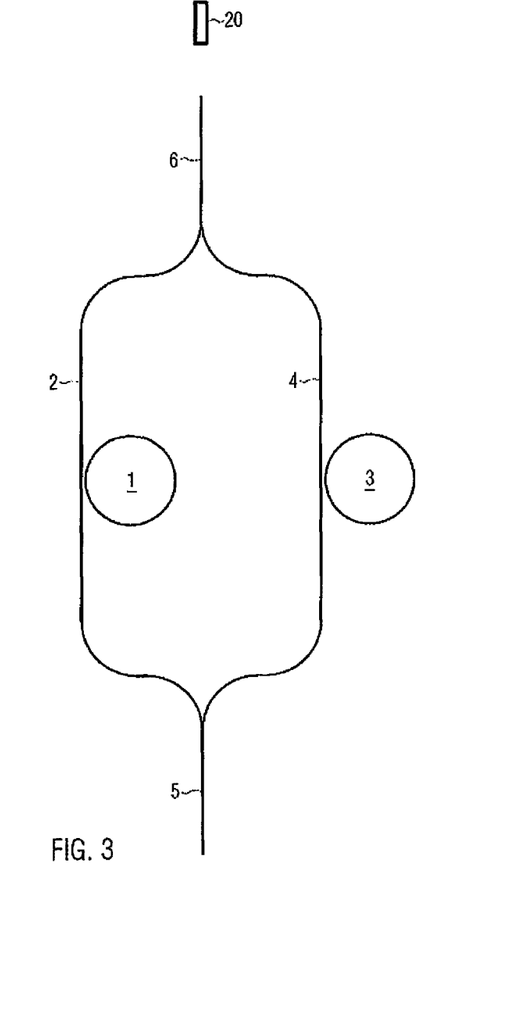

FIG. 3 shows a variant of the spectroscopy assembly in which a common continuous wave (cw) laser 20 is used for both resonators 1, 3. The splitting of the cw-laser radiation into the two waveguides 2, 4 is then effected via a fiber-optic component 6 or a correspondingly shaped on-chip waveguide.

Figure 4:
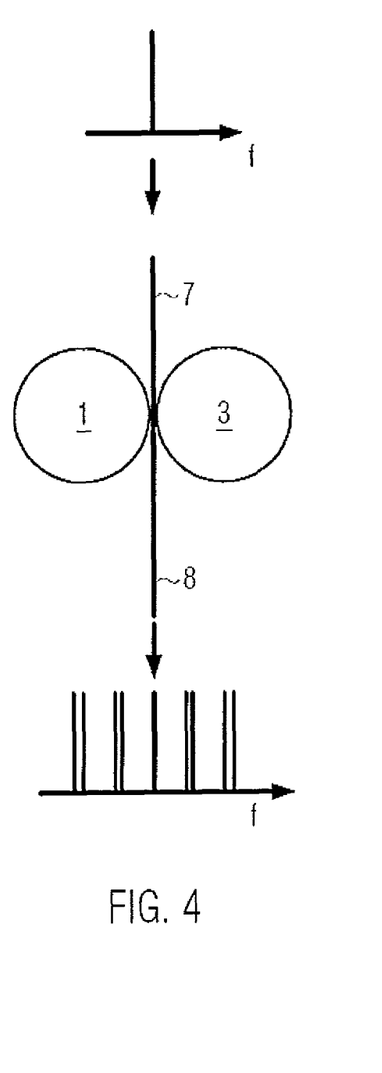

In another geometry shown in FIG. 4, a common waveguide 7 couples at two resonators simultaneously and thus generates two frequency combs with the mode distances f1 and f2 which are coupled out again on the coupling-out side 8 into the common waveguide 7.

Above the spectroscopy assembly, the line spectrum of the cw-laser radiation is schematically shown in FIG. 4, while below the assembly, the coupled-out frequency spectrum of the two superimposed frequency combs is shown.

Figure 5:
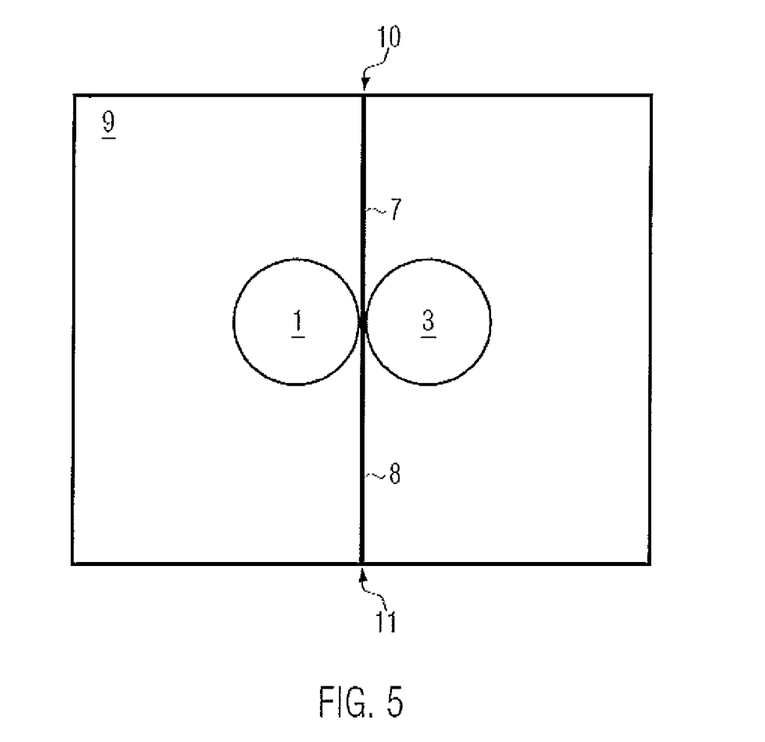

FIG. 5 shows the spectroscopy assembly according to FIG. 4, now, however, with the (semiconductor) substrate 9 on which the ring resonators 1, 3 and the common waveguide 7 are located. On the substrate (chip) 9, there are a coupling-in point (inlet port) 10 for the cw-laser radiation and a coupling-out point (outlet port) 11 for the frequency combs generated by the two resonators 1, 3.

Figure 6:
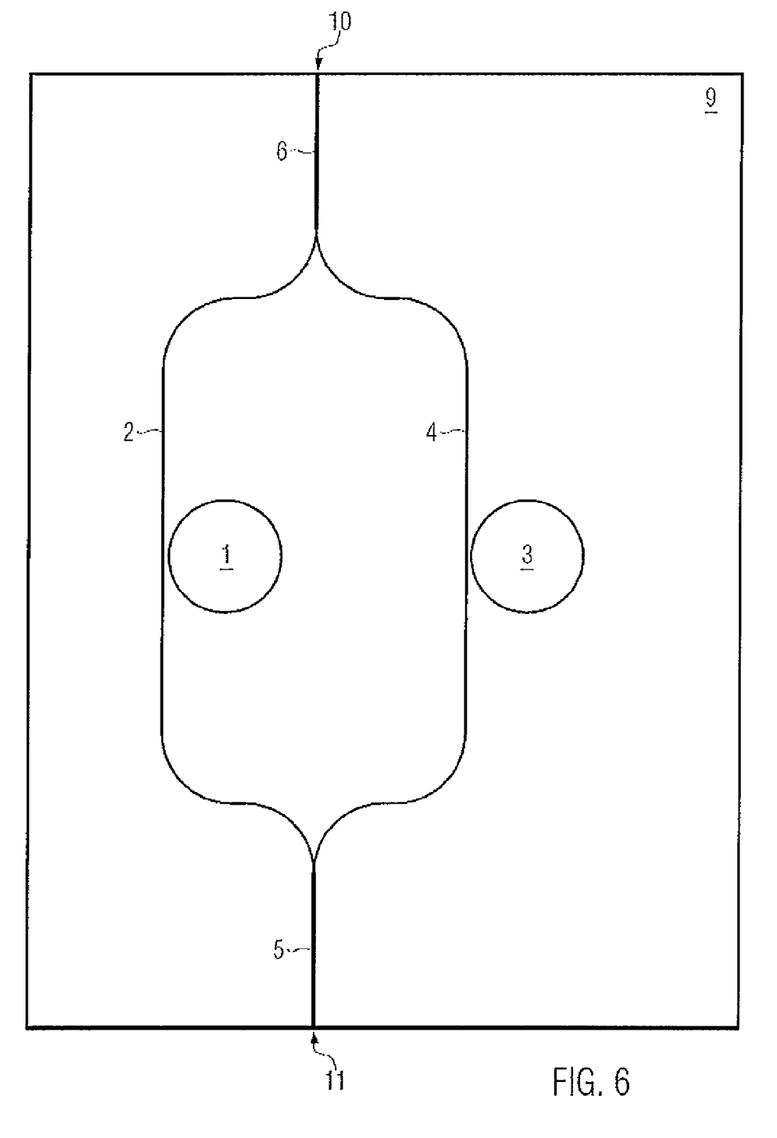

The same applies to the assembly with two coupled waveguides 2, 4. FIG. 6 shows the spectroscopy assembly of FIG. 3, this time, however, with the substrate 9, the coupling-in point 10 and the coupling-out point 11. These coupling-in or coupling-out points 10, 11 may be omitted if the cw-laser or the cw-lasers and/or a photodetector are integrated on the substrate/chip 9.

Figure 7:
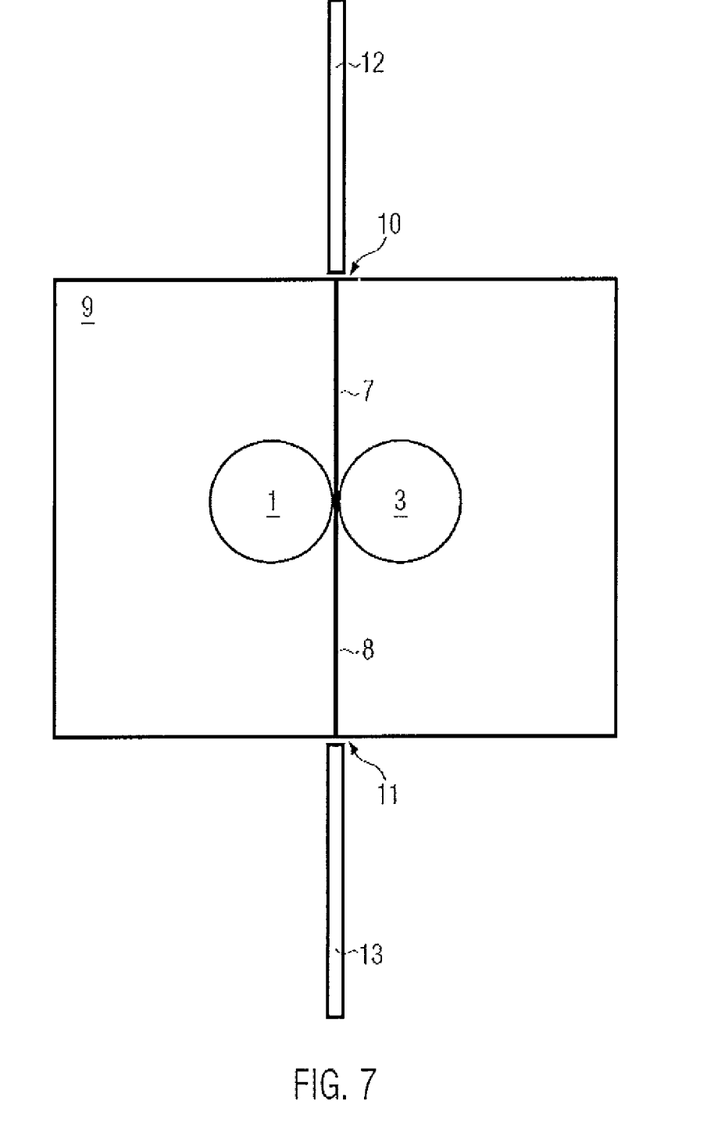

To couple in light into the waveguides 7, a glass fiber 12 may be attached to the waveguide 7 at the coupling-in side (so-called butt coupling). The same applies to the coupling-out side. This is shown in FIG. 7.

Figure 8:
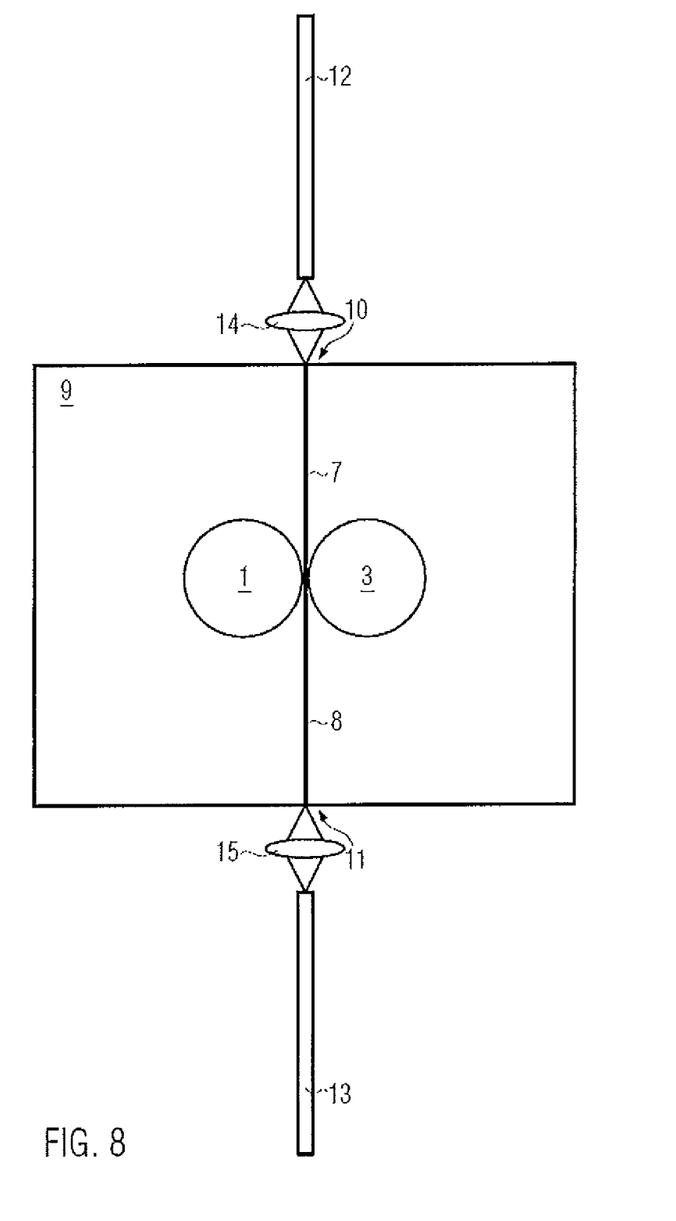

To improve the coupling-in and coupling-out of the glass fiber 12 into the waveguide 7, or from the waveguide 8 into the coupling-out glass fiber 13, a lens 14, 15 may be used between the waveguide and the glass fiber 12, 13. This is shown in FIG. 8. The two variants shown in FIG. 7 and FIG. 8 of the coupling-in or coupling-out of light into or out of the waveguides 2, 4, 7, 8 may be used in all embodiments.

Figure 9:
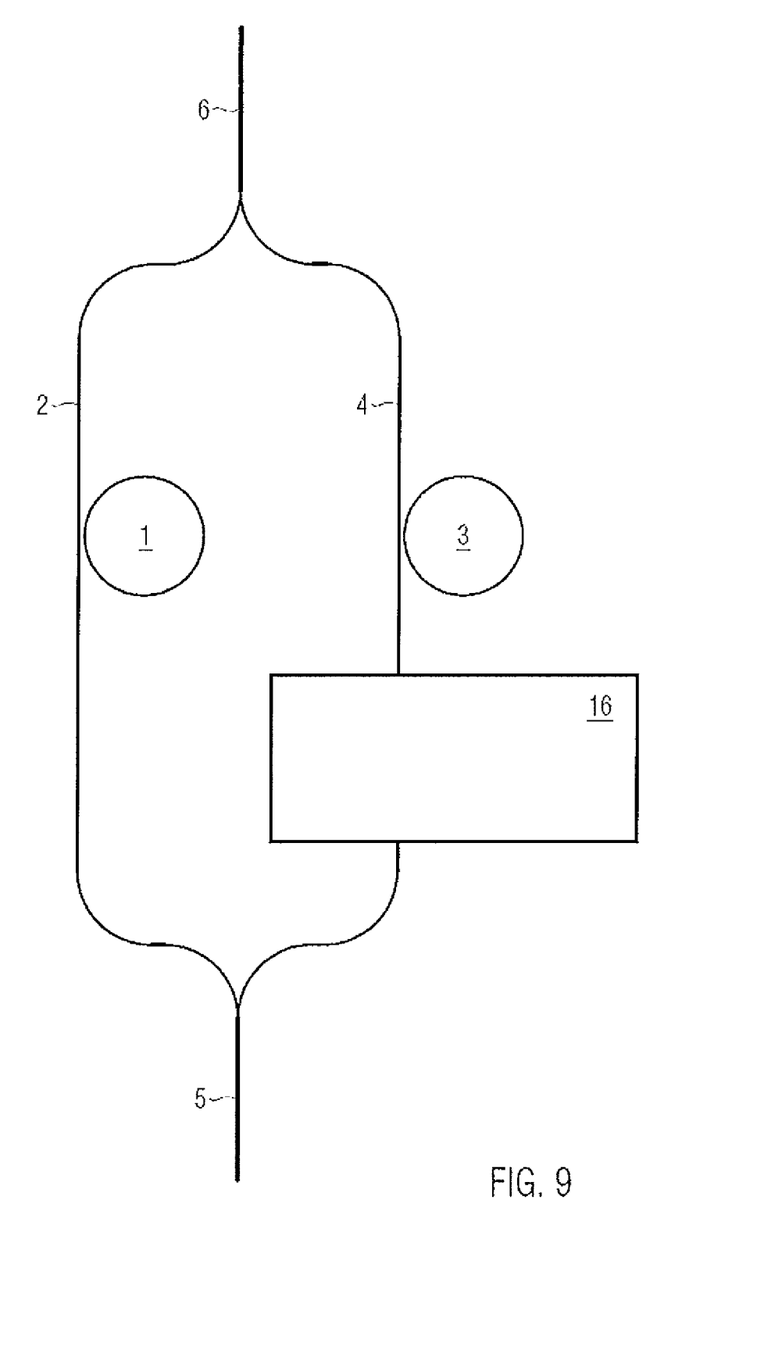

For performing multi-heterodyne spectroscopy, a sample 16 may be inserted into an arm of the spectroscopy assembly as is shown in FIG. 9.

Figure 10:
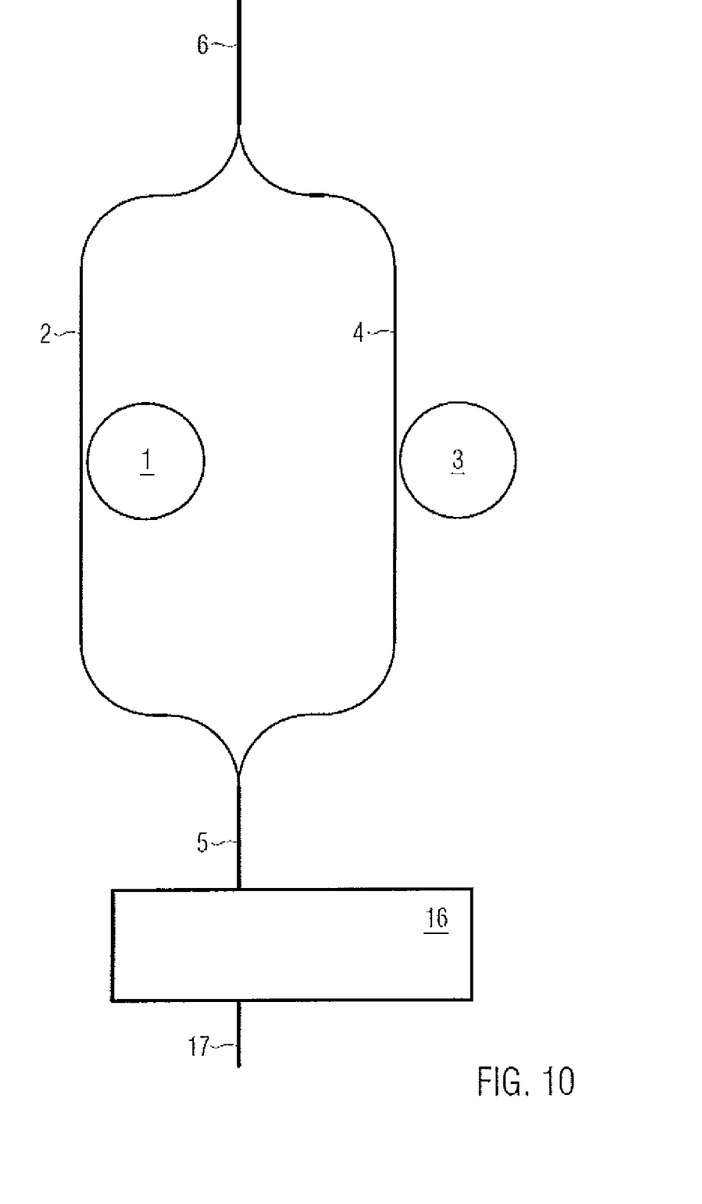

As an alternative, the sample 16 may also be—as shown in FIG. 10—arranged behind the joining point 5 and thus be irradiated by both frequency combs. The output 17 then leads to a photodetector.

Figure 11:
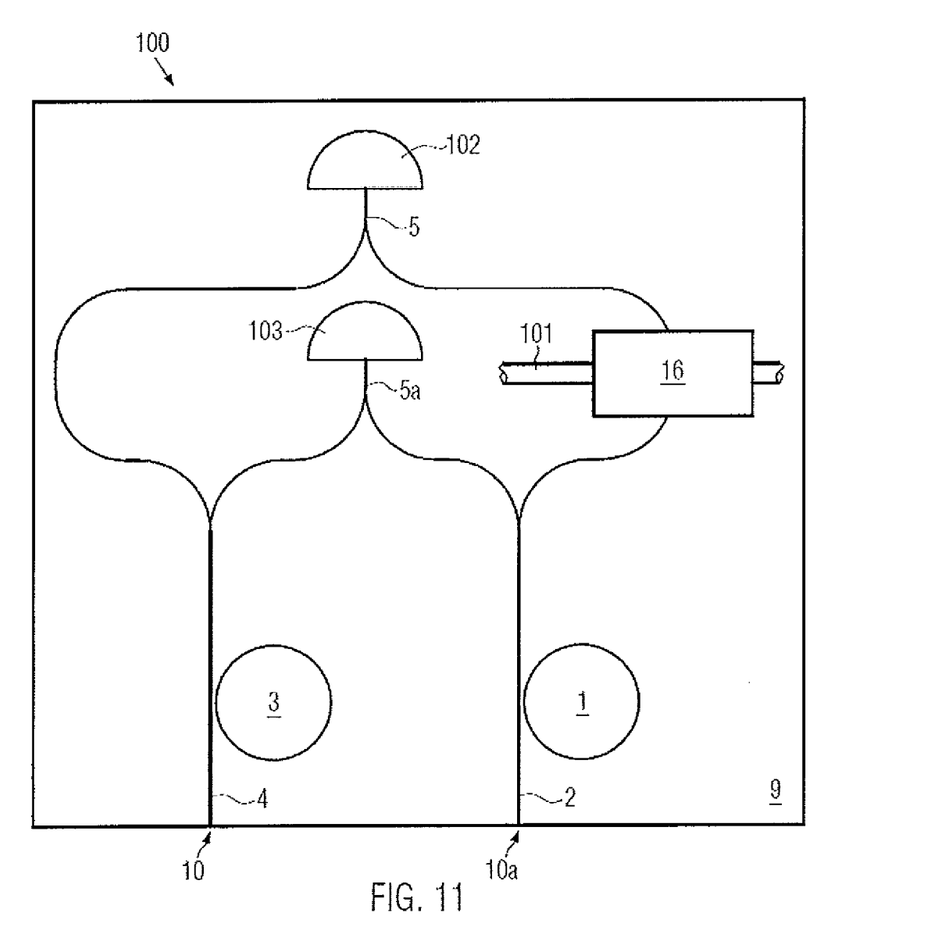

FIG. 11 shows a further variant of the spectroscopy assembly 100 according to the invention. This embodiment of the spectroscopy assembly is based on the embodiment shown in FIG. 9—except for the fact that in the embodiment according to FIG. 11, two coupling-in points 10, 10a are provided for the laser radiation and the light spreads in the two waveguides 2, 4 in FIG. 11 from the bottom to the top, and no longer (as in FIG. 9) from the top to the bottom. Again, however, the two ring resonators 1, 3 and the waveguides 2, 4 and the joining point 5 of the two waveguides 2, 4 (i.e. the coupling-out point 5) are arranged on a common substrate 9. In the one arm of the spectroscopy assembly 100, namely in the course of the waveguide 2, there moreover is a sample chamber 16. The sample to be examined may be introduced into this sample chamber 16 by microfluidic technology, in particular with microfluid channels 101. These are also provided on the substrate 9. Furthermore, a detector 102 is arranged or embodied on the substrate 9, for example a photodiode. On this first detector 102, the light is directed out of the output 5 of the spectroscopy assembly 100 to there measure a beat signal.

Beyond these features already present in the embodiment according to FIG. 9, the spectroscopy assembly 100 according to FIG. 11 has a second detector 103 which may also be a photodiode and which is also provided or arranged on the substrate 9. On this second photodetector 103, the light of a second output 5a of the spectroscopy assembly 100 is guided. Light from the two waveguides 2, 4 is guided to this second output 5a, however without the sample being present in one of the two paths. Thereby, the signal generated by the second photodetector 103 may be compared to the signal of the first photodetector 102 and thus be used for the self-calibration of the spectroscopy assembly 100.

The invention claimed is:

1. A spectroscopy assembly comprising:
   first and second optical ring resonators each comprising a material with an intensity-dependent refraction index; and
   at least one waveguide which is guided along the optical ring resonators at such a distance that light of a continuous wave laser guided in the at least one waveguide is coupled into the optical ring resonators and a frequency comb generated from the light of the continuous wave laser in the optical ring resonators is coupled out into the at least one waveguide;
   wherein the optical ring resonators and the at least one waveguide are on a common substrate; and
   wherein the first optical ring resonator has a first free spectral range and the second optical ring resonator has a second free spectral range, and the first free spectral range differs from the second free spectral range by less than 1/100 of a mean free spectral range of the first and second optical ring resonators.

2. The spectroscopy assembly according to claim 1, wherein the common substrate is a semiconductor chip.

3. The spectroscopy assembly according to claim 1, wherein the common substrate comprises silicon.

4. The spectroscopy assembly according to claim 1, wherein the at least one waveguide comprises a common waveguide, the common waveguide coupling in continuous wave laser radiation into both of the optical ring resonators.

5. The spectroscopy assembly according to claim 1, wherein the at least one waveguide comprises a first waveguide and a second waveguide, the first waveguide being associated with the first optical ring resonator and the second waveguide being associated with the second optical ring resonator.

6. The spectroscopy assembly according to claim 5, wherein the at least one waveguide further comprises a common waveguide on the common substrate that is split into the first waveguide and the second waveguide on a coupling-in side for the light of the continuous wave laser.

7. The spectroscopy assembly according to claim 1, wherein the at least one waveguide comprises a first waveguide and a second waveguide for each of the first and second optical ring resonators, the first waveguide of each of the first and second optical ring resonators being used for pumping the first and second optical ring resonators with the light of the continuous wave laser, and the second waveguide of each of the first and second optical ring resonators being used for coupling a frequency comb out of the first and second optical ring resonators.

8. The spectroscopy assembly according to claim 1, further including a common continuous wave laser or two separate continuous wave lasers for pumping the first and second optical ring resonators.

9. The spectroscopy assembly according to claim 1, further including at least one continuous wave laser on the common substrate.

10. The spectroscopy assembly according to claim 1, further including at least one optical detector on the common substrate.

11. The spectroscopy assembly according to claim 1, wherein at least one of the following are microstructures on the common substrate:
(a) the first and second optical ring resonators,
(b) the at least one waveguide and at least one continuous wave laser, and
(c) at least one optical detector.

12. The spectroscopy assembly according to claim 1, further including an optical amplifier for following the continuous wave laser.

13. The spectroscopy assembly according to claim 1, further including a sample chamber supplied via microfluid channels.

14. The spectroscopy assembly according to claim 1, further including a multimode pumping source with two or more longitudinal modes with a tunable mode distance for pumping at least one of the first and second optical ring resonators.

15. The spectroscopy assembly according to claim 1, wherein at least one of the first and second optical ring resonators is configured for coupling two or more mode families of different free spectral ranges by a geometry of the first and second optical ring resonators, by corrugations of a resonator wall, or by a non-circular deformation of the geometry of the first and second optical ring resonators.

16. The spectroscopy assembly according to claim 1, wherein the first and second optical ring resonators differ from each other by the material thereof and/or by having a different coating on the material thereof.

17. The spectroscopy assembly according to claim 1, wherein the material of the first and second optical ring resonators comprises SiN or $HfO_2$.

18. The spectroscopy assembly according to claim 1, wherein each of the first and second optical ring resonators has a diameter of 120 to 160 μm.

19. A spectroscopy assembly comprising:
first and second optical ring resonators each comprising a material with an intensity-dependent refraction index; and
at least one waveguide which is guided along the optical ring resonators at such a distance that light of a continuous wave laser guided in the at least one waveguide is coupled into the optical ring resonators and a frequency comb generated from the light of the continuous wave laser in the optical ring resonators is coupled out into the at least one waveguide;
wherein the optical ring resonators and the at least one waveguide are on a common substrate; and
two photodetectors, wherein light from the first and second optical ring resonators can be fed to both photodetectors, wherein, a sample chamber is provided in only one of two paths of light leading to one of the two photodetectors.

20. A spectroscopy assembly comprising:
first and second optical ring resonators each comprising a material with an intensity-dependent refraction index; and
at least one waveguide which is guided along the optical ring resonators at such a distance that light of a continuous wave laser guided in the at least one waveguide is coupled into the optical ring resonators and a frequency comb generated from the light of the continuous wave laser in the optical ring resonators is coupled out into the at least one waveguide;
wherein the optical ring resonators and the at least one waveguide are on a common substrate; and
a sample chamber arranged such that said frequency comb is guided from said optical ring resonators to the sample chamber via the at least one waveguide.

* * * * *